US012654407B2

(12) United States Patent
Louie

(10) Patent No.: US 12,654,407 B2
(45) Date of Patent: Jun. 16, 2026

(54) AUTOMATED FIBER PLACEMENT SYSTEM CONFIGURED TO LAY DOWN A PLURALITY OF WIDTHS OF COMPOSITE TAPES

(71) Applicant: The Boeing Company, Arlington, VA (US)

(72) Inventor: Michael Kenneth-Que Louie, Renton, WA (US)

(73) Assignee: The Boeing Company, Arlington, VA (US)

( * ) Notice: Subject to any disclaimer, the term of this patent is extended or adjusted under 35 U.S.C. 154(b) by 126 days.

(21) Appl. No.: 18/335,376

(22) Filed: Jun. 15, 2023

(65) Prior Publication Data

US 2024/0416596 A1 Dec. 19, 2024

(51) Int. Cl.
B29C 70/38 (2006.01)
B29L 31/30 (2006.01)

(52) U.S. Cl.
CPC .......... B29C 70/384 (2013.01); B29C 70/382 (2013.01); B29C 70/386 (2013.01); B29C 70/388 (2013.01); B29L 2031/3076 (2013.01)

(58) Field of Classification Search
CPC ... B29C 70/384; B29C 70/382; B29C 70/386; B29C 70/388; B29L 2031/3076
See application file for complete search history.

(56) References Cited

U.S. PATENT DOCUMENTS 9,481,158 B2 * 11/2016 Horst .................. B32B 38/0004
2014/0238612 A1 * 8/2014 Vaniglia ................ B29C 70/384
156/510

2015/0106062 A1 * 4/2015 Chen-Keat ............. B29C 70/30
703/1
2016/0263877 A1 9/2016 Kisch et al.
2017/0136694 A1 * 5/2017 Rezai ...................... B33Y 30/00
2020/0016850 A1 * 1/2020 Humfeld ................. B32B 5/022
2020/0254701 A1 * 8/2020 Modin .................. B29C 70/545
2021/0206122 A1 7/2021 Kawabe et al.
2023/0040244 A1 * 2/2023 Li ............................ B32B 5/12

FOREIGN PATENT DOCUMENTS

WO 2019122431 A1 6/2019

OTHER PUBLICATIONS

Extended European Search Report, dated Nov. 18, 2024, regarding EP Application No. 24174835.9, 9 pages.
Brasington et al., "Automated fiber placement: A review of history, current technologies, and future paths forward," Composites Part C: Open Access, vol. 6, 2021, Available online Aug. 15, 2021, 18 pages.
European Patent Office Action, dated Oct. 1, 2025, regarding EP Application No. 24174835.9, 9 pages.

* cited by examiner

Primary Examiner — George R Koch
Assistant Examiner — Christopher C Caillouet
(74) Attorney, Agent, or Firm — Yee & Associates, P.C.

(57) ABSTRACT

An automated fiber placement system is provided. The automated fiber placement system comprises a plurality of spools of composite material having a plurality of material widths, each spool of the plurality of spools having a respective material width of the plurality of material widths; and an automated fiber placement head configured to lay up composite tape from any desired spools of the plurality of spools simultaneously.

20 Claims, 10 Drawing Sheets

| | 520 | 522 | 516 | 508 | 510 | 512 | 514 | 524 | 526 | 506 |
|---|---|---|---|---|---|---|---|---|---|---|
| 504 → | 0.25 | 0.25 | 0.25 | 1 | 1 | 1 | 1.05 | 1.05 | 1.1 | 1.1 |
| 511 → 2 | | | | X | X | | | | | |
| 515 → 2.05 | | | | | | X | X | | | |
| 2.1 | | | | | | | X | X | | |
| 2.15 | | | | | | | | X | X | |
| 2.2 | | | | | | | | | X | X |
| 2.25 | | | X | X | X | | | | | |
| 2.3 | | | X | | | X | X | | | |
| 2.35 | | | X | | | | X | X | | |
| 2.4 | | | X | | | | | X | X | |
| 2.45 | | | X | | | | | | X | X |
| 2.5 | | X | X | X | X | | | | | |
| 2.55 | | X | X | | | X | X | | | |
| 2.6 | | X | X | | | | X | X | | |
| 2.65 | | X | X | | | | | X | X | |
| 2.7 | | X | X | | | | | | X | X |
| 2.75 | X | X | X | X | X | | | | | |
| 2.8 | X | X | X | | | X | X | | | |
| 2.85 | X | X | X | | | | X | X | | |
| 2.9 | X | X | X | | | | | X | X | |
| 518 → 2.95 | X | X | X | | | | | | X | X |
| 528 → 3 | | | | X | X | X | | | | |

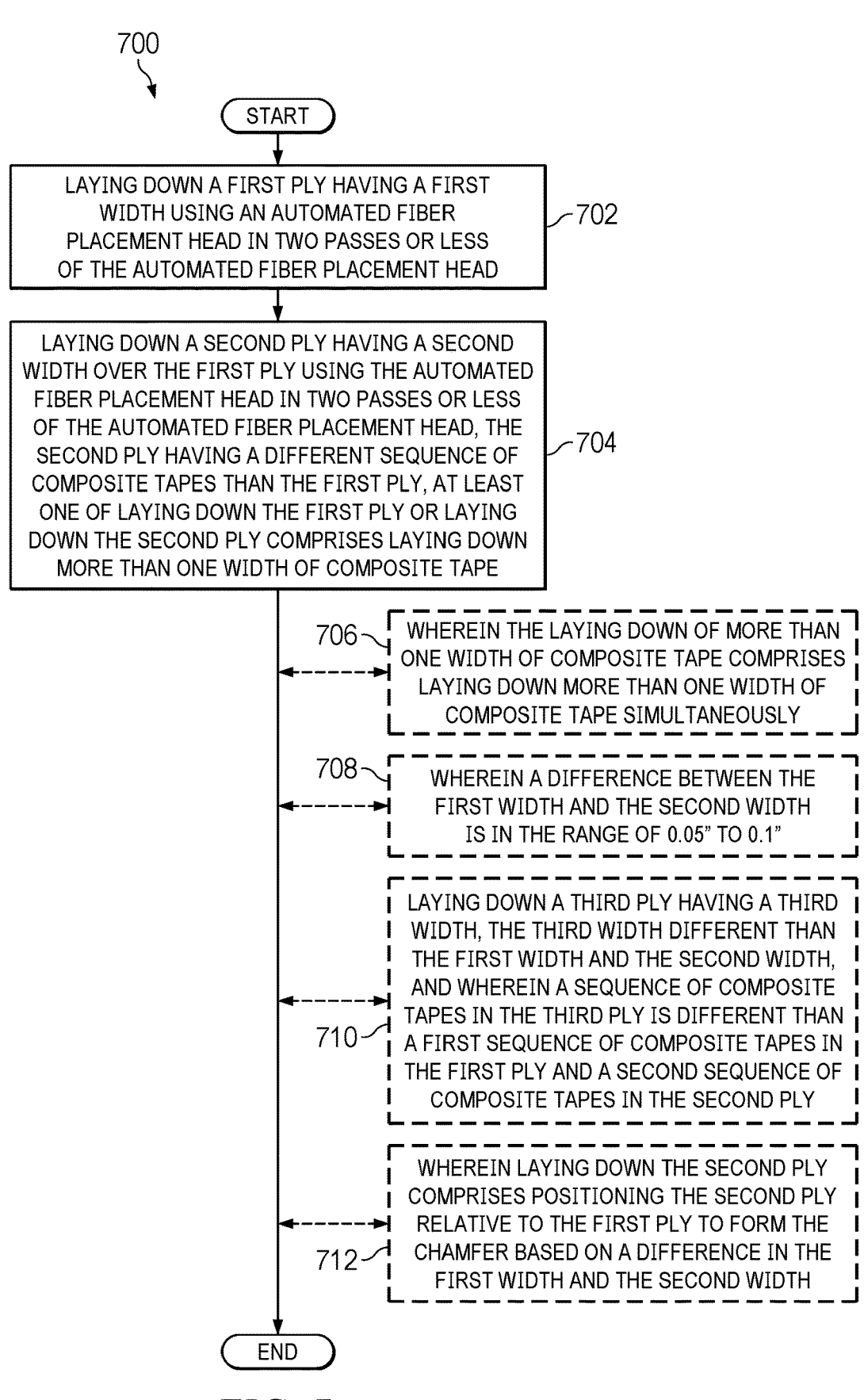

START

LAYING DOWN A FIRST PLY HAVING A FIRST WIDTH USING AN AUTOMATED FIBER PLACEMENT HEAD IN TWO PASSES OR LESS OF THE AUTOMATED FIBER PLACEMENT HEAD          702

LAYING DOWN A SECOND PLY HAVING A SECOND WIDTH OVER THE FIRST PLY USING THE AUTOMATED FIBER PLACEMENT HEAD IN TWO PASSES OR LESS OF THE AUTOMATED FIBER PLACEMENT HEAD, THE SECOND PLY HAVING A DIFFERENT SEQUENCE OF COMPOSITE TAPES THAN THE FIRST PLY, AT LEAST ONE OF LAYING DOWN THE FIRST PLY OR LAYING DOWN THE SECOND PLY COMPRISES LAYING DOWN MORE THAN ONE WIDTH OF COMPOSITE TAPE          704

706 ─ WHEREIN THE LAYING DOWN OF MORE THAN ONE WIDTH OF COMPOSITE TAPE COMPRISES LAYING DOWN MORE THAN ONE WIDTH OF COMPOSITE TAPE SIMULTANEOUSLY

708 ─ WHEREIN A DIFFERENCE BETWEEN THE FIRST WIDTH AND THE SECOND WIDTH IS IN THE RANGE OF 0.05" TO 0.1"

LAYING DOWN A THIRD PLY HAVING A THIRD WIDTH, THE THIRD WIDTH DIFFERENT THAN THE FIRST WIDTH AND THE SECOND WIDTH, AND WHEREIN A SEQUENCE OF COMPOSITE TAPES IN THE THIRD PLY IS DIFFERENT THAN A FIRST SEQUENCE OF COMPOSITE TAPES IN THE FIRST PLY AND A SECOND SEQUENCE OF COMPOSITE TAPES IN THE SECOND PLY          710

WHEREIN LAYING DOWN THE SECOND PLY COMPRISES POSITIONING THE SECOND PLY RELATIVE TO THE FIRST PLY TO FORM THE CHAMFER BASED ON A DIFFERENCE IN THE FIRST WIDTH AND THE SECOND WIDTH          712

END

902 — SPECIFICATION AND DESIGN

904 — MATERIAL PROCUREMENT

906 — COMPONENT AND SUBASSEMBLY MANUFACTURING

908 — SYSTEM INTEGRATION

910 — CERTIFICATION AND DELIVERY

912 — IN SERVICE

914 — MAINTENANCE AND SERVICE

1000

AIRCRAFT

1002 — AIRFRAME

INTERIOR — 1006

SYSTEMS

PROPULSION SYSTEM

ELECTRICAL SYSTEM 1008  1012

1010  1014

HYDRAULIC SYSTEM

ENVIRONMENTAL SYSTEM

1004

AUTOMATED FIBER PLACEMENT SYSTEM CONFIGURED TO LAY DOWN A PLURALITY OF WIDTHS OF COMPOSITE TAPES

BACKGROUND INFORMATION

1. Field

The present disclosure relates generally to composite manufacturing, and more specifically to automated fiber placement of multiple widths of composite tapes.

2. Background

In composite manufacturing, some composite parts are laid up by hand. The composite parts may be laid up by hand and transported by hand due to at least one of the composite part being a one-off unique design, having a chamfer, or other complexities of the design. Laying up composite parts by hand adds time to the manufacturing process.

Therefore, it would be desirable to have a method and apparatus that takes into account at least some of the issues discussed above, as well as other possible issues.

SUMMARY

An embodiment of the present disclosure provides an automated fiber placement system. The automated fiber placement system a plurality of spools of composite material having a plurality of material widths and an automated fiber placement head configured to lay up composite tape from any desired spools of the plurality of spools simultaneously. Each spool of the plurality of spools has a respective material width of the plurality of material widths.

Another embodiment of the present disclosure provides an automated fiber placement system. Automated fiber placement system comprises an automated fiber placement head configured to lay down a plurality of material widths of composite tape simultaneously to form plies of a composite part, the plies having different widths.

Yet another embodiment of the present disclosure provides a method of forming a composite filler having a chamfer. A first ply having a first width is laid down using an automated fiber placement head in two passes or less of the automated fiber placement head. A second ply having a second width is laid down over the first ply using the automated fiber placement head in two passes or less of the automated fiber placement head. The second ply has a different sequence of composite tapes than the first ply. At least one of laying down the first ply or laying down the second ply comprises laying down more than one width of composite tape.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 5A and 5B are an illustration of a proposed order of lanes for an automated fiber placement system in accordance with an illustrative embodiment;

FIG. 7 is a flowchart of a method of forming a composite filler having a chamfer in accordance with an illustrative embodiment;

DETAILED DESCRIPTION

Figure 1:
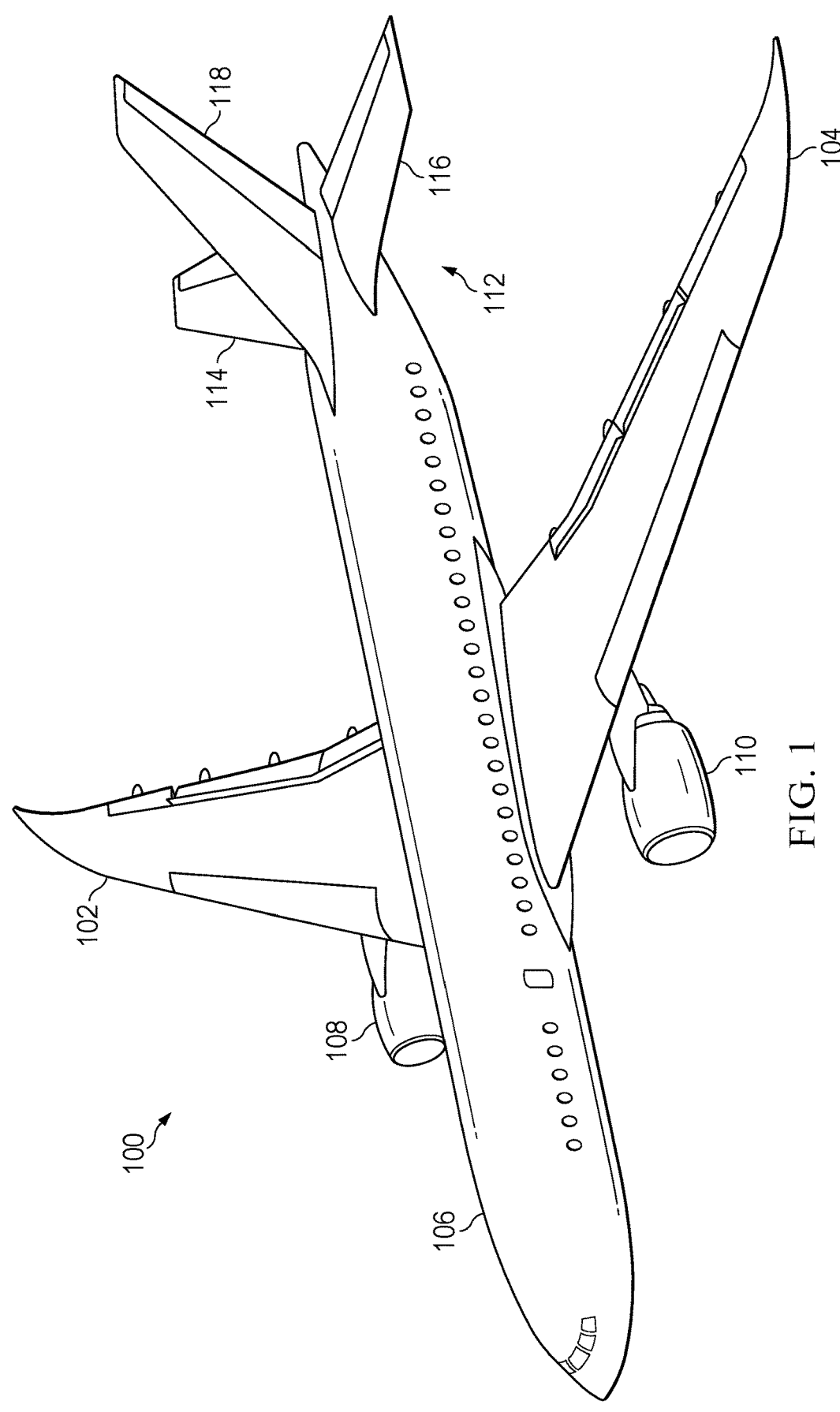
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite parts formed using the automated fiber placement system of the illustrative examples. For example, portions of at least one of wing 102, wing 104, or body 106 can be laid up using an automated fiber placement system of the illustrative examples. In some illustrative examples, a composite filler of at least one of wing 102, wing 104, or body 106 can be laid up using an automated fiber placement system of the illustrative examples.

Figure 2:
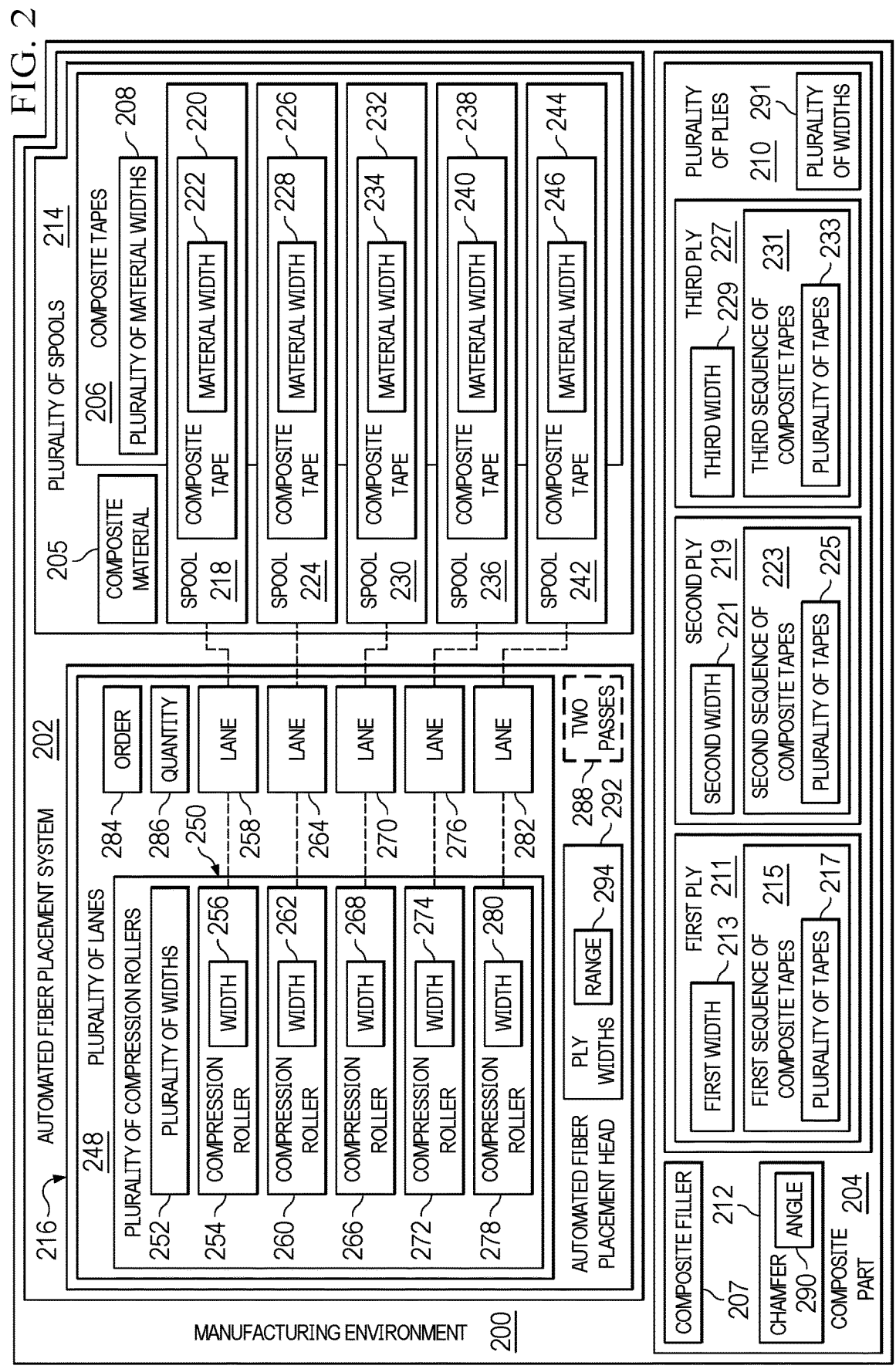
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Automated fiber placement system 202 in manufacturing environment 200 can be used to lay down composite part 204. Automated fiber placement system 202 is configured to lay down composite tapes 206 having plurality of material widths 208 to form plurality of plies 210 forming chamfer 212.

Automated fiber placement system 202 comprises plurality of spools 214 of composite material 205 having plurality of material widths 208 and automated fiber placement head 216 configured to lay up composite tape from any desired spools of plurality of spools 214 of composite material 205 simultaneously. Each spool of plurality of spools 214 of composite material 205 has a respective material width of plurality of material widths 208. For example, spool 218 holds composite tape 220 with material width 222. Spool 224 holds composite tape 226 with material width 228. Spool 230 holds composite tape 232 with material width 234. Spool 236 holds composite tape 238 with material width 240. Spool 242 holds composite tape 244 with material width 246.

Plurality of material widths 208 is selected to form a plurality of widths of plies. In some illustrative examples, plurality of material widths 208 is selected to form chamfer 212 with angle 290. Chamfer 212 has angle 290 created by differences in plurality of widths 291 of plurality of plies 210. Plurality of material widths 208 can be changed based on desired widths of plies for composite part 204.

Automated fiber placement head 216 comprises plurality of lanes 248 for laying down composite tapes 206. Each lane of plurality of lanes 248 is fed by a respective spool of plurality of spools 214 of composite material 205. Automated fiber placement head 216 comprises plurality of compression rollers 250. Each compression roller of plurality of compression rollers 250 is assigned to a respective lane of plurality of lanes 248.

Plurality of compression rollers 250 has plurality of widths 252. Plurality of widths 252 includes any desirable quantity of widths. Each compression roller has a respective width ba284 sed on a material width of a respective spool feeding the respective lane. For example, compression roller 254 is assigned to lane 258. Compression roller 254 has width 256 based on a material width 222 of spool 218 feeding lane 258.

As depicted, spool 218 of composite tape 220 feeds lane 258. Compression roller 254 is assigned to lane 258 of plurality of lanes 248. Compression roller 254 has width 256 based on material width 222 of composite tape 220.

Spool 224 of composite tape 226 feeds lane 264. Compression roller 260 is assigned to lane 264 of plurality of lanes 248. Compression roller 260 has width 262 based on material width 228 of composite tape 226.

Spool 230 of composite tape 232 feeds lane 270. Compression roller 266 is assigned to lane 270 of plurality of lanes 248. Compression roller 266 has width 268 based on material width 234 of composite tape 232.

Spool 236 of composite tape 238 feeds lane 276. Compression roller 272 is assigned to lane 276 of plurality of lanes 248. Compression roller 272 has width 274 based on material width 240 of composite tape 238.

Spool 242 of composite tape 244 feeds lane 282. Compression roller 278 is assigned to lane 282 of plurality of lanes 248. Compression roller 278 has width 280 based on material width 246 of composite tape 244.

In some illustrative examples, plurality of lanes 248 is ordered based on angle 290 of chamfer 212 in a design of composite part 204. In some illustrative examples, composite part 204 takes the form of composite filler 207. It is desirable to lay down composite tapes 206 from adjacent lanes in each pass. For example, order 284 of plurality of lanes 248 is configured to create plurality of plies 210 in two passes 288 or less. Plurality of lanes 248 has any desirable quantity 286 of lanes to enable layup of plurality of plies 210. In some illustrative examples, quantity 286 is ten lanes. Five lanes of plurality of lanes 248 are depicted in FIG. 2.

Plurality of lanes 248 is ordered to layup each ply of composite part 204 in two passes 288 or less. In each pass of two passes 288, the deposited composite tapes for each pass are adjacent to each other. For each pass of two passes 288, the deposited composite tapes for the respective pass are in adjacent lanes.

Plurality of material widths 208 is selected to layup a respective width of each ply of composite part 204 in two passes 288 or less. In this illustrative example, plurality of material widths 208 is selected to layup first width 213 of first ply 211, second width 221 of second ply 219, and third width 229 of third ply 227.

In some illustrative examples, plurality of material widths 208 is selected to provide ply widths 292 every 0.05 inches within range 294 of ply widths 292 in two passes 288 or less. In some illustrative examples, range 294 is two inches to five inches. In some illustrative examples, range 294 is two inches to four inches.

In some illustrative examples, plurality of spools 214 of composite material 205 comprises three or more widths of composite material 205. Plurality of material widths 208 comprises any desirable quantity of widths. In some illustrative examples, plurality of material widths 208 comprises two widths. In some illustrative examples, plurality of material widths 208 comprises three widths. In some illustrative examples, plurality of material widths 208 comprises more than three widths. Any desirable quantity of each material width of plurality of material widths 208 is present in plurality of spools 214.

In some illustrative examples, plurality of spools 214 of composite material 205 comprises 0.25 inches, 1 inches, 1.05 inches, and 1.1 inches widths of composite material 205. In these illustrative examples, plurality of material widths 208 comprises 0.25 inches, 1 inches, 1.05 inches, and 1.1 inches widths of composite material 205.

In some illustrative examples, plurality of lanes 248 is ordered to place plurality of material widths 208 side-by-side to form a contiguous ply of a desired width and a desired length. Order 284 is configured to place selected material widths of plurality of material widths 208 side-by-side to form a contiguous ply of a desired width.

Automated fiber placement system 202 comprises automated fiber placement head 216 configured to lay down plurality of material widths 208 of composite tape simultaneously to form plurality of plies 210 of composite part 204, plurality of plies 210 having different widths. Plurality of plies 210 form composite part 204. Additionally, differences in the widths of plurality of plies 210 form chamfer 212. Plurality of lanes 248 of automated fiber placement head 216 is ordered based on angle 290 of chamfer 212 in a design of composite part 204.

First ply 211 has first width 213. First width 213 is formed by first sequence of composite tapes 215. First sequence of composite tapes 215 comprises plurality of tapes 217. In some illustrative examples, first sequence of composite tapes 215 comprises more than one material width. First sequence of composite tapes 215 is a quantity and order of material widths. First sequence of composite tapes 215 can be laid in up to two passes 288 of automated fiber placement head 216.

Plurality of tapes 217 comprises a subset of composite tapes 206. The subset is selected based on first width 213. The subset is selected based on order 284 of plurality of lanes 248.

Second ply 219 has second width 221. Second width 221 is formed by second sequence of composite tapes 223. Second sequence of composite tapes 223 is different from first sequence of composite tapes 215. Second sequence of composite tapes 223 is different from first sequence of composite tapes 215 to generate second width 221 different from first width 213. Second sequence of composite tapes 223 comprises plurality of tapes 225.

In some illustrative examples, the second sequence of composite tapes comprises more than one material width. Second sequence of composite tapes 223 can be laid in up to two passes 288 of automated fiber placement head 216. In some illustrative examples, first sequence of composite tapes 215 and second sequence of composite tapes 223 include at least one of the same material widths. In some illustrative examples, first sequence of composite tapes 215 and second sequence of composite tapes 223 do not include the same material widths.

In some illustrative examples, first sequence of composite tapes 215 and second sequence of composite tapes 223 include at least one of the same composite spools. For example, first sequence of composite tapes 215 and second sequence of composite tapes 223 can both include composite tape 220 from spool 218 and composite tape 226 from spool 224. In some illustrative examples, first sequence of composite tapes 215 and second sequence of composite tapes 223 have at least one composite tape not in common. For example, second sequence of composite tapes 223 can have composite tape 232 from spool 230. By having at least one composite tape not in common, first width 213 is different from second width 221. In some illustrative examples, although first sequence of composite tapes 215 and second sequence of composite tapes 223 include composite tapes of the same material width, plurality of tapes 217 and plurality of tapes 225 cannot have any composite spools in common.

Third ply 227 has third width 229. Third width 229 is formed by third sequence of composite tapes 231. Third sequence of composite tapes 231 is different from second sequence of composite tapes 223 and first sequence of composite tapes 215. By third sequence of composite tapes 231 being different from both second sequence of composite tapes 223 and first sequence of composite tapes 215, third width 229 is different from first width 213 and second width 221.

Third sequence of composite tapes 231 comprises plurality of tapes 233. In some illustrative examples, third sequence of composite tapes 231 comprises more than one material width. Third sequence of composite tapes can be laid in up to two passes 288 of automated fiber placement head 216. In some illustrative examples, the third sequence includes a composite tape in common with at least one of the second sequence or the first sequence.

Composite filler 207 is laid up ply by ply. Plurality of plies 210 is laid up sequentially. Each ply of plurality of plies 210 is laid up in a longitudinal direction. Each ply of plurality of plies 210 is laid up in a direction parallel to the edge of composite part 204 forming chamfer 212.

In some illustrative examples, plurality of spools 214 of composite material 205 is mounted on automated fiber placement head 216. Automated fiber placement system 202 further comprises plurality of compression rollers 250. Each compression roller of plurality of compression rollers 250 is assigned to a respective lane of plurality of lanes 248. Each compression roller of plurality of compression rollers 250 has a width based on a respective width of plurality of material widths 208 of composite tapes 206.

Plurality of lanes 248 is ordered to layup each ply of composite part 204 in two passes 288 or less. Plurality of material widths 208 is selected to layup a respective width of each ply of composite part 204 in two passes 288 or less.

Fillers, such as composite filler 207, constitute the highest quantity of discrete parts in a fuselage of an aircraft. Composite filler 207 can be a unique part.

Conventional composite manufacturing includes laying up each composite filler by hand. Conventional composite manufacturing includes individual management of each composite filler throughout a production system and then placement by hand. Using a conventional process, each composite filler is laid up by hand, taking an undesirable amount of time to manufacture.

Fabricating the fillers offline takes an undesirably long time. Additionally, management of hundreds and/or thousands of composite fillers is a production system challenge.

Automated fiber placement system 202 reduces manufacturing time and production management. Automated fiber placement system 202 enables automated layup of composite fillers, such as composite filler 207. Automated fiber placement system 202 enables automated layup of composite fillers, such as composite filler 207 directly on a mandrel. By laying up composite filler 207 directly on the mandrel, composite filler 207 is not stored or managed by a production system. Automated fiber placement system 202, including automated fiber placement head 216, is configured to layup composite fillers having chamfers. Forming composite filler 207 using automated fiber placement system 202 reduces at least one of operator time, lay-up time, management time, or management complexity.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although only five spools are depicted, any desirable spools can be present in plurality of spools 214. In some illustrative examples, plurality of spools 214 comprises ten spools of composite material 205.

As another example, although not depicted in FIG. 2, a slitter can be provided to cut composite material 205 to plurality of material widths 208. For example, a slitter can be provided to cut composite tape 220 to material width 222 prior to being placed on spool 218.

In some illustrative examples, automated fiber placement head 216 can be dockable. In these illustrative examples, automated fiber placement head 216 can be removed and replaced on an automated fiber placement machine (not depicted). In these illustrative examples, automated fiber placement head 216 can attach to a typical automated fiber placement (AFP) machine.

In these illustrative examples, composite material 205 is cut to plurality of material widths 208 by at least one slitter prior to being supplied to automated fiber placement head 216. In some other illustrative examples, automated fiber placement head 216 is not dockable. In some illustrative examples, at least one slitter is provided on a permanent automated fiber placement head.

Figure 3:
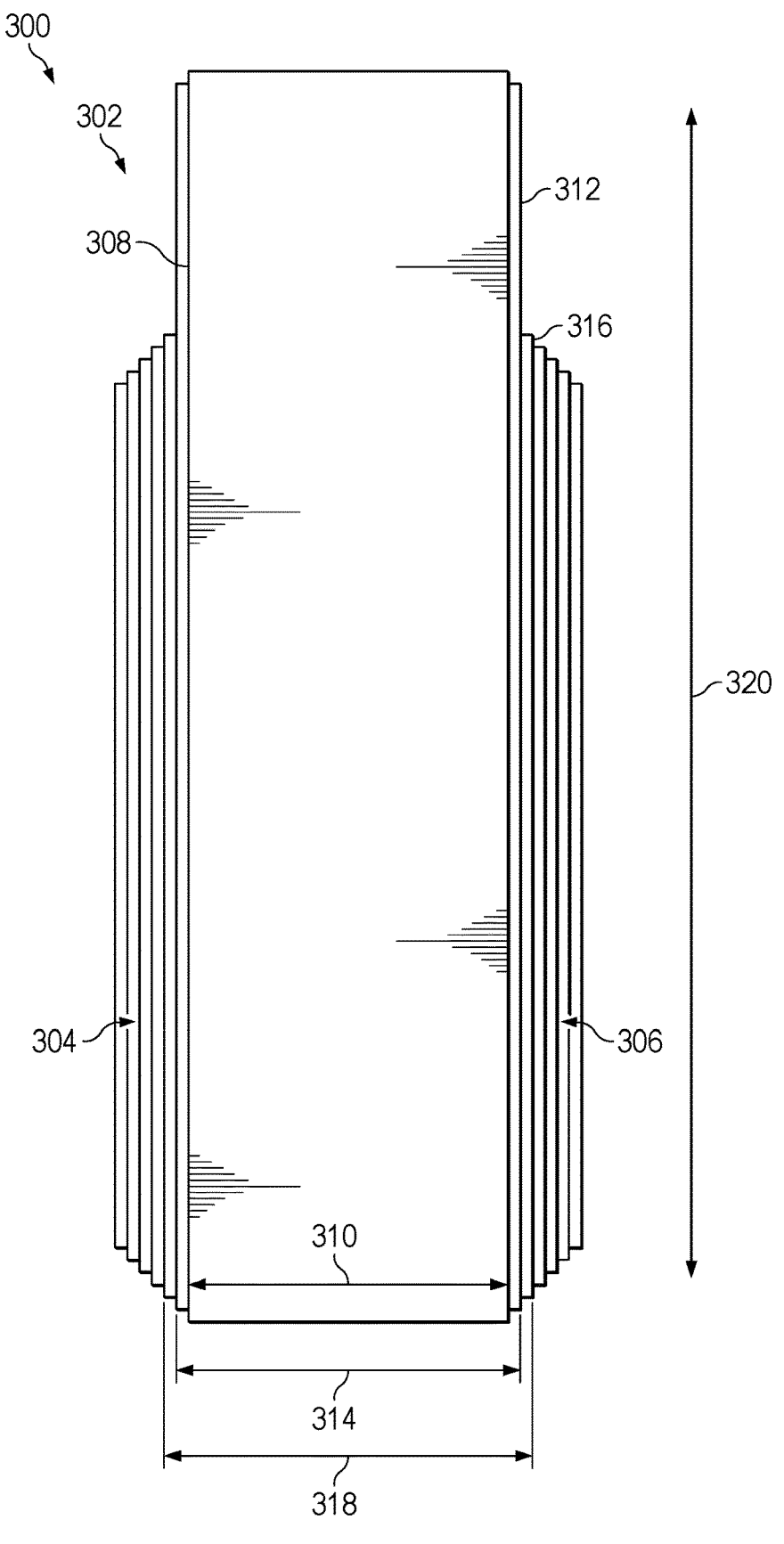
FIG. 3 is an illustration of a top view of a composite filler in accordance with an illustrative embodiment.

Turning now to FIG. 3, an illustration of a top view of a composite filler is depicted in accordance with an illustrative embodiment. Composite filler 300 can be a component of aircraft 100 of FIG. 1. Composite filler 300 can be laid down by automated fiber placement system 202 of FIG. 2. Composite filler 300 can be a physical implementation of composite filler 207 of FIG. 2.

Composite filler 300 comprises plurality of plies 302. Each of plurality of plies 302 has its own respective width. The locations and widths of plurality of plies 302 form chamfer 304 and chamfer 306 of composite filler 300. Chamfer 304 has an angle. Chamfer 306 has an angle. The widths of plurality of plies 302 are configured to form each of chamfer 304 and chamfer 306. Each ply of plurality of plies 302 is formed of a respective sequence of composite tapes. The sequence of composite tapes is selected to form the respective width of the ply.

For example, first ply 308 has first width 310. First width 310 is formed by a first sequence of composite tapes (not depicted). The first sequence of composite tapes comprises a plurality of tapes. In some illustrative examples, the first sequence of composite tapes comprises more than one material width. The first sequence of composite tapes can be laid in up to two passes of an automated fiber placement head.

Second ply 312 has second width 314. Second width 314 is formed by a second sequence of composite tapes (not depicted). The second sequence of composite tapes is different from the first sequence of composite tapes. The second sequence of composite tapes comprises a second plurality of tapes. In some illustrative examples, the second sequence of composite tapes comprises more than one material width. The second sequence of composite tapes can be laid in up to two passes of an automated fiber placement head. In some illustrative examples, the first sequence and the second sequence include some composite material spools. The first sequence of composite tapes and the second sequence of composite tapes have at least one composite tape not in common.

Third ply 316 has third width 318. Third width 318 is formed by a third sequence of composite tapes (not depicted). The third sequence of composite tapes is different from the second sequence of composite tapes and the first sequence of composite tapes. The third sequence of composite tapes comprises a third plurality of tapes. In some illustrative examples, the third sequence of composite tapes comprises more than one material width. The third sequence of composite tapes can be laid in up to two passes of an automated fiber placement head. In some illustrative examples, the third sequence includes a composite tape in common with at least one of the second sequence or the first sequence.

Composite filler 300 is laid up ply by ply. Plurality of plies 302 is laid up sequentially. Each ply of plurality of plies 302 is laid up in direction 320. Laying composite tapes in direction 320 creates composite filler 300 faster than laying composite material in a direction perpendicular to direction 320, from chamfer 304 to chamfer 306.

Figure 4:
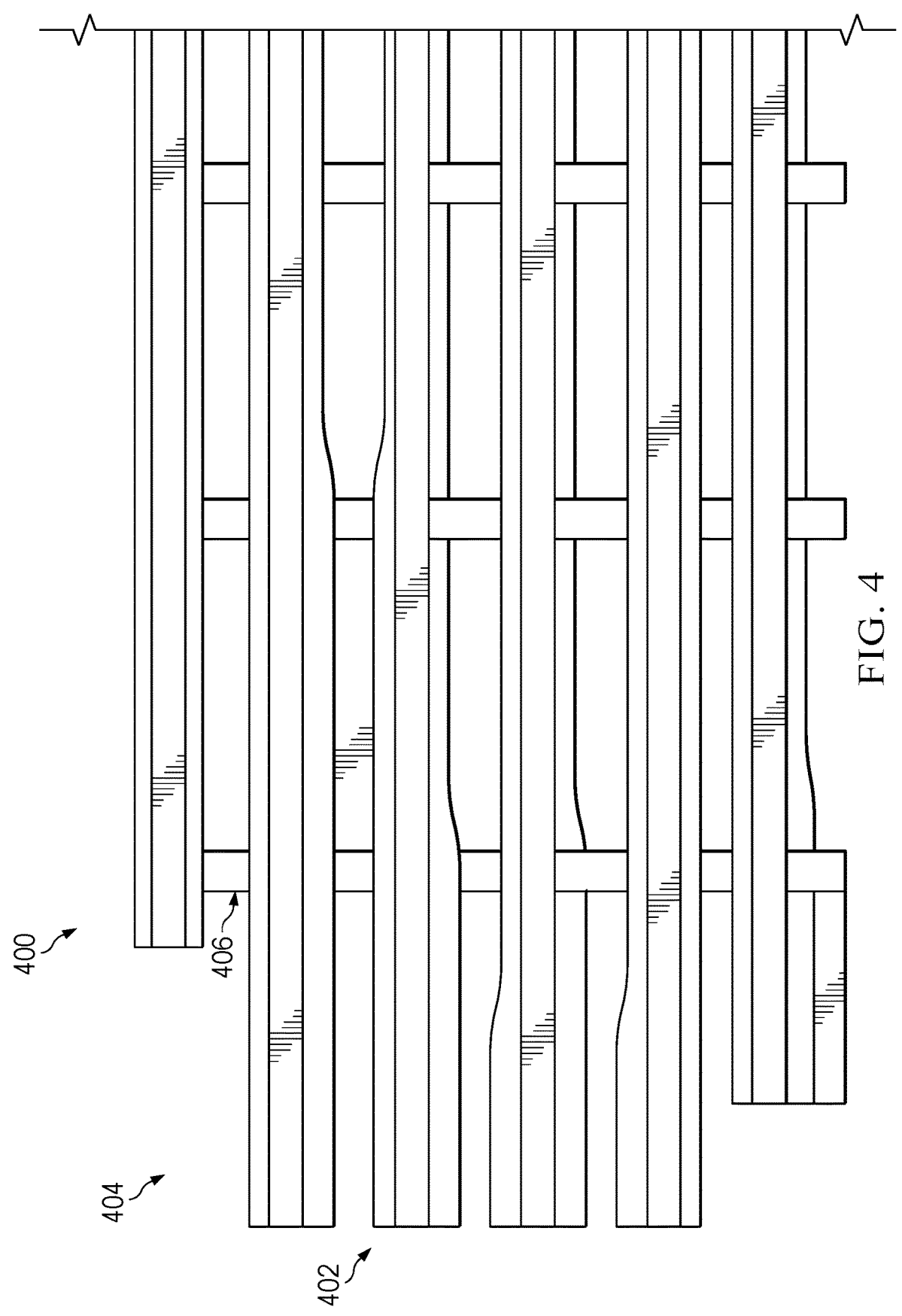
FIG. 4 is an illustration of an isometric view of a composite assembly with a plurality of composite fillers in accordance with an illustrative embodiment.

Turning now to FIG. 4, an illustration of an isometric view of a composite assembly with a plurality of composite fillers is depicted in accordance with an illustrative embodiment. Stringers 402 and composite fillers 406 can be portions of aircraft 100 of FIG. 1. Composite fillers 406 can be physical implementations of composite filler 207 of FIG. 2. Composite filler 300 of FIG. 3 can be one of composite fillers 406. In manufacturing environment 400, stringers 402 are positioned on mandrel 404. Composite fillers 406 can be laid up directly on mandrel 404 by automated fiber placement system 202 of FIG. 2.

Composite fillers 406 are not structural components. Composite fillers 406 are not configured to provide structural support to an aircraft, such as aircraft 100 of FIG. 1.

Figure 5B:
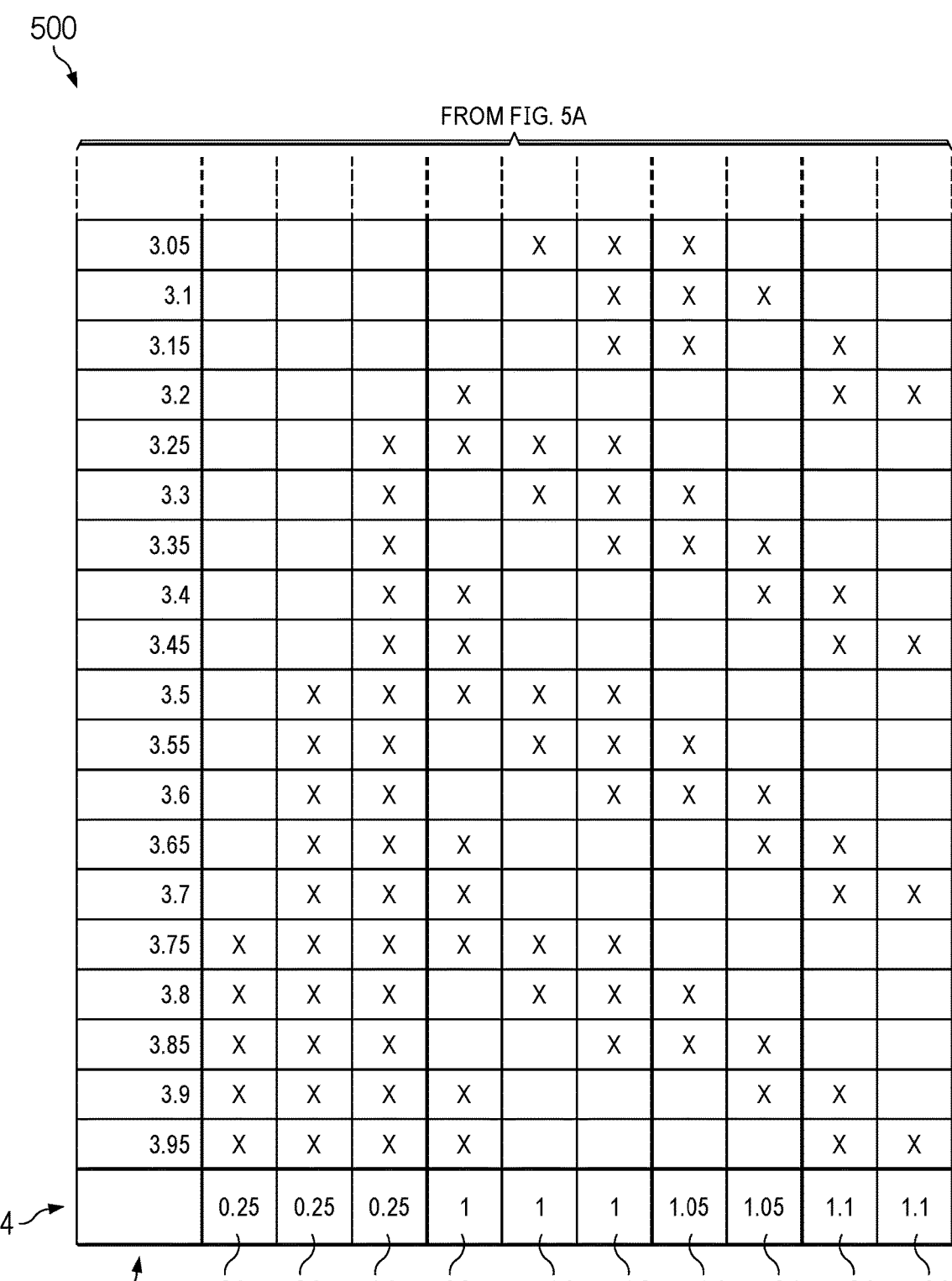

Turning now to FIGS. 5A and 5B, an illustration of a proposed order of lanes for an automated fiber placement system is depicted in accordance with an illustrative embodiment. Matrix 500 is a chart of ply widths 502 and lanes 504 with respective material widths 506. Lanes 504 are representative of plurality of lanes 248 of FIG. 2. Configuration 507 of lanes 504 can be used to layup composite filler 300 of FIG. 3. In some illustrative examples, an automated fiber placement head with configuration 507 of lanes 504 can be used to layup composite fillers 406 of FIG. 4.

An automated fiber placement system, such as automated fiber placement system 202 of FIG. 2, can be used to lay down composite tape from lanes 504. Each lane of lanes 504 is fed by a respective spool of a plurality of spools of composite material. An automated fiber placement head is configured to lay up composite tape from any desired spools of the plurality of spools of composite material simultaneously. The automated fiber placement head is configured to lay up composite tape from any desired spools by being configured to lay up composite tape from any desired lanes of lanes 504 simultaneously.

Lanes 504 are configured to produce each ply width of ply widths 502 using two passes or less. Each pass lays down composite material tapes from adjacent lanes. Configuration 507 of lanes 504 includes material widths 506 used and the order of material widths 506 within lanes 504.

For example, a two inch ply can be laid up in a single pass using lane four 508 and lane five 510 in sequence of composite tapes 511. In configuration 507 of lanes 504, lane four 508 and lane five 510 have the same material width. In configuration 507 of lanes 504, lane four 508 and lane five 510 are each one inch material width composite tape. A single pass lays down composite material tapes from adjacent lanes, lane four 508 and lane five 510, to form a two inch ply.

A 2.05 inch ply can be laid up in a single pass using lane six 512 and lane seven 514 in sequence of composite tapes 515. In configuration 507 of lanes 504, lane six 512 and lane seven 514 have different material widths. Although lane five 510 and lane six 512 have the same material width, lane five 510 and lane six 512 are fed by different material spools. A single pass lays down composite material tapes from adjacent lanes, lane six 512 and lane seven 514, to form a 2.05 inch ply.

In this illustrative example, sequence of composite tapes 511 and sequence of composite tapes 515 have no lanes in common. In this illustrative example, sequence of composite tapes 511 and sequence of composite tapes 515 have one material width in common. In this illustrative example, sequence of composite tapes 515 has a material width not found in sequence of composite tapes 511.

Other plies are laid up in two passes with configuration 507 of lanes 504. For example, a 2.3 inch ply can be laid up in two passes. A first pass is made using lane three 516 and a second pass is made using lane six 512 and lane seven 514.

Sequence of composite tapes 518 used to lay up a ply of 2.95 inches includes three composite tapes of 0.25 inches and two composite tapes of 1.1 inches width. In configuration 507 of lanes 504, a ply having a width of 2.95 inches is laid up in two passes. In the first pass, lane one 520, lane two 522, and lane three 516 are laid up. In the second pass, lane nine 524 and lane ten 526 are laid up. First pass lays down composite material of adjacent lanes, lane one 520, lane two 522, and lane three 516. Second pass lays down composite material of adjacent lanes, lane nine 524 and lane ten 526. The second pass is laid down so that the five composite tapes are laid down side-by-side to form a contiguous ply having a width of 2.95 inches.

A ply of 2.95 inches is laid up with a sequence of composite tapes different from a sequence of composite tapes for forming a ply of three inches. The sequence of composite tapes to lay up a ply of three inches includes three composite tapes of one inch, as can be seen in sequence of composite tapes 528. In configuration 507 of lanes 504, sequence of composite tapes 528 forming a ply having a width of three inches is laid up in one pass.

In some illustrative examples, a sequence of composite tapes for a respective ply can have at least one of the same material widths in common with a ply laid immediately before or after the ply. In some illustrative examples, a sequence of composite tapes for a respective ply can have no material widths in common with at least one of a ply laid immediately before or after the ply.

Plurality of material widths 506 is selected to provide ply widths every 0.05 inches within a range of ply widths 502 in two passes or less. The depicted range is two inches to 3.95 inches. In some illustrative examples, the depicted range is two inches to five inches.

In some illustrative examples, the plurality of spools of composite material comprises three or more material widths. In this depicted illustrative example, four material widths are provided. Although each material width is positioned in adjacent lanes in lanes 504, in other non-depicted configurations, a material width can be present in lanes that are not adjacent.

In some illustrative examples, the plurality of spools of composite material comprises 0.25 inches, 1 inches, 1.05 inches, and 1.1 inches widths of composite material. In other non-depicted examples, the plurality of spools of composite material can have other widths of composite material.

The illustrative examples can utilize a new hybrid ten lane automated fiber placement (AFP) head to layup directly onto a layup mandrel after stringers are placed. In matrix 500, there are three lanes of ¼ inches material width, three lanes of 1 inches material width, two lanes of 1.05 inches material width, and two lanes of 1.1 inches material width. As depicted each material width is adjacent to the composite material of the same material width. For example, the three lanes of ¼ inches material width are lane one 520, lane two 522, and lane three 516. In other non-depicted examples, a different configuration can have at least one material width separated from other composite materials having the same material width.

Matrix 500 depicts how all filler widths between two inches and four inches can be placed with no more than two passes per ply. The lengths of the plies can be cut to the specified engineering sizes using an automated fiber placement (AFP) head.

Figure 6:
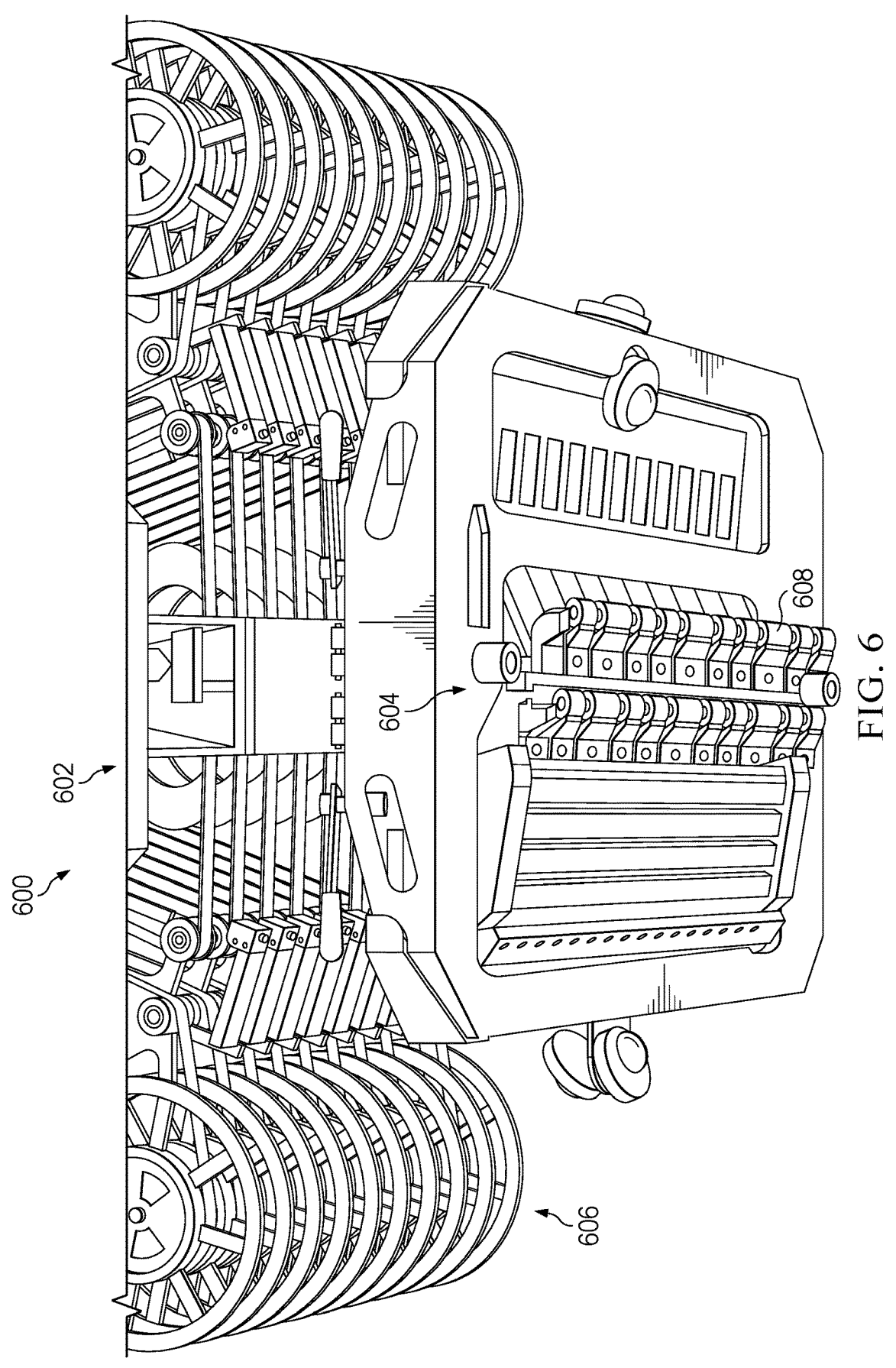
FIG. 6 is an illustration of an isometric view of an automated fiber placement system in accordance with an illustrative embodiment.

Turning now to FIG. 6, an illustration of an isometric view of an automated fiber placement system is depicted in accordance with an illustrative embodiment. Automated fiber placement system 600 is a physical implementation of automated fiber placement system 202 of FIG. 2. Automated fiber placement system 600 can be used to lay up composite filler 300 of FIG. 3. Automated fiber placement system 600 can be used in manufacturing environment 400 of FIG. 4 to lay up composite fillers 406. Automated fiber placement system 600 can have configuration 507 of FIGS. 5A and 5B.

Automated fiber placement system 600 comprises automated fiber placement head 602 with plurality of lanes 604. Plurality of spools 606 provides composite material having a plurality of material widths. Plurality of spools 606 of composite material each have a respective material width of a plurality of material widths provided by plurality of spools 606. Plurality of lanes 604 lay down the composite material. Each lane of plurality of lanes 604 is fed by a respective spool of plurality of spools 606 of composite material.

Automated fiber placement head 602 is configured to lay up composite tape from any desired spools of plurality of spools 606 simultaneously. Each lane of plurality of lanes 604 is fed by a respective spool of plurality of spools 606 of composite material. Automated fiber placement head 602 comprises plurality of lanes 604 for laying down the composite material. Automated fiber placement head 602 comprises plurality of compression rollers 608. Each compression roller of plurality of compression rollers 608 is assigned to a respective lane of plurality of lanes 604. Each compression roller has a respective width based on a material width of a respective spool feeding the respective lane.

Turning now to FIG. 7, a flowchart of a method of forming a composite filler having a chamfer is depicted in accordance with an illustrative embodiment. Method 700 can be used to form composite parts of aircraft 100 of FIG. 1. Method 700 can be used to form composite part 204 of FIG. 2. Method 700 can be used to form composite filler 300 of FIG. 3. Method 700 can be used to form composite fillers 406 of FIG. 4. Method 700 can be performed using configuration 507 of lanes 504 of FIGS. 5A and 5B. Method 700 can be performed using automated fiber placement system 600 of FIG. 6.

Method 700 lays down a first ply having a first width using an automated fiber placement head in two passes or less of the automated fiber placement head (operation 702). Method 700 lays down a second ply having a second width over the first ply using the automated fiber placement head in two passes or less of the automated fiber placement head, the second ply having a different sequence of composite tapes than the first ply, at least one of laying down the first ply or laying down the second ply comprises laying down more than one width of composite tape (operation 704). Afterwards, method 700 terminates.

In some illustrative examples, laying down of more than one width of composite tape comprises laying down more than one width of composite tape simultaneously (operation 706). When more than one width of composite tape is laid simultaneously, the more than one width of composite tape is laid in a single pass. In some illustrative examples, two composite material widths are laid down in a single pass. In some illustrative examples, more than two composite material widths are laid down in a single pass. In these illustrative examples, the different material widths are each adjacent to each other.

In some illustrative examples, a difference between the first width and the second width is in the range of 0.05 inches to 0.1 inches (operation 708). In some illustrative examples, the difference between the first width and the second width forms the chamfer.

In some illustrative examples, method 700 lays down a third ply having a third width, the third width different than the first width and the second width, and wherein a sequence of composite tapes in the third ply is different than a first sequence of composite tapes in the first ply and a second sequence of composite tapes in the second ply (operation 710). In some illustrative examples, the third width is less than both the second width and the first width. In some illustrative examples, reduction of width from first width to second width and second width to third width forms the chamfer.

In some illustrative examples, laying down the second ply comprises positioning the second ply relative to the first ply to form the chamfer based on a difference in the first width and the second width (operation 712). In some illustrative examples, laying down the second ply comprises centering the second ply horizontally on top of the first ply such that laying down the second ply forms the chamfer. In some illustrative examples, the second ply is laid up directly on top of the first ply.

Figure 8:
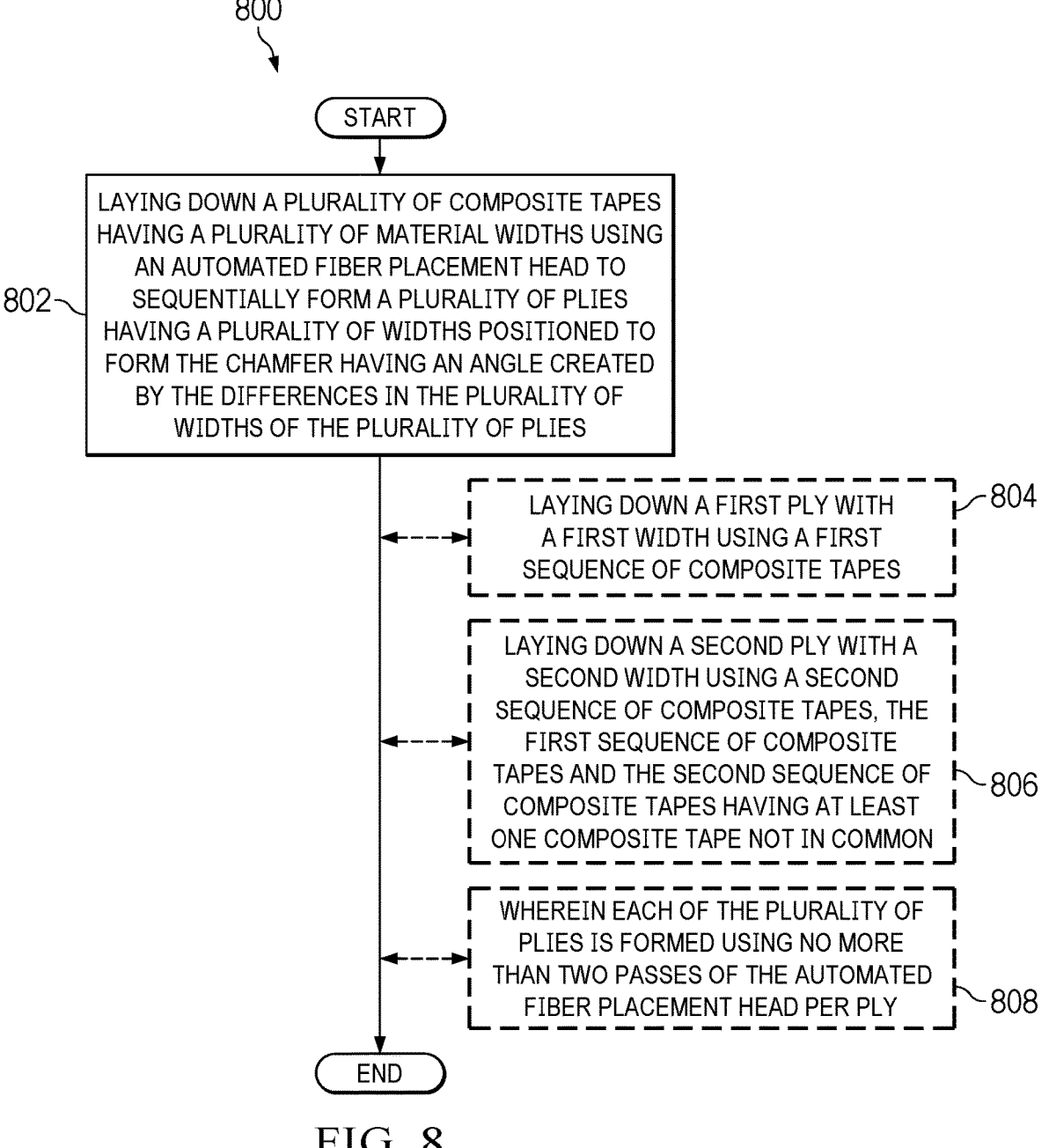
FIG. 8 is a flowchart of a method of forming a composite filler having a chamfer in accordance with an illustrative embodiment.

Turning now to FIG. 8, a flowchart of a method of forming a composite filler having a chamfer is depicted in accordance with an illustrative embodiment. Method 800 can be used to form composite parts of aircraft 100 of FIG. 1. Method 800 can be used to form composite part 204 of FIG. 2. Method 800 can be used to form composite filler 300 of FIG. 3. Method 800 can be used to form composite fillers 406 of FIG. 4. Method 800 can be performed using a configuration of lanes 504 of FIGS. 5A and 5B. Method 800 can be performed using automated fiber placement system 600 of FIG. 6.

Method 800 lays down a plurality of composite tapes having a plurality of material widths using an automated fiber placement head to sequentially form a plurality of plies having a plurality of widths positioned to form the chamfer having an angle created by the differences in the plurality of widths of the plurality of plies (operation 802). Afterwards, method 800 terminates.

In some illustrative examples, laying down the plurality of composite tapes having a plurality of material widths comprises laying down a first ply with a first width using a first sequence of composite tapes (operation 804) and laying down a second ply with a second width using a second sequence of composite tapes, the first sequence of composite tapes and the second sequence of composite tapes having at least one composite tape not in common (operation 806). In some illustrative examples, each of the plurality of plies is formed using no more than two passes of the automated fiber placement head per ply (operation 808).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 706 through operation 712 may be optional. For example, operation 804 through operation 808 may be optional.

Figure 9:
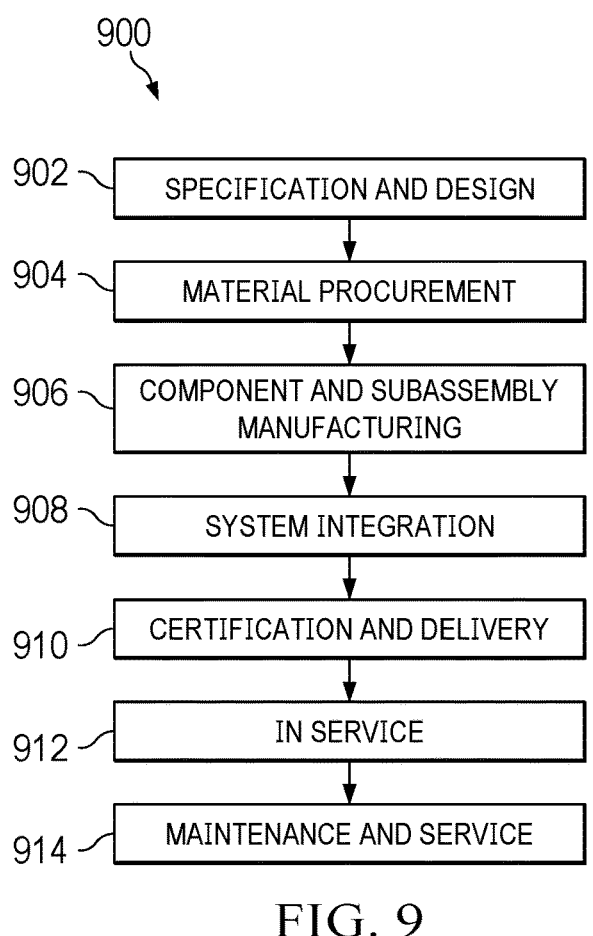
FIG. 9 is an illustration of an aircraft manufacturing and service method in a form of a block diagram in accordance with an illustrative embodiment.
Figure 10:
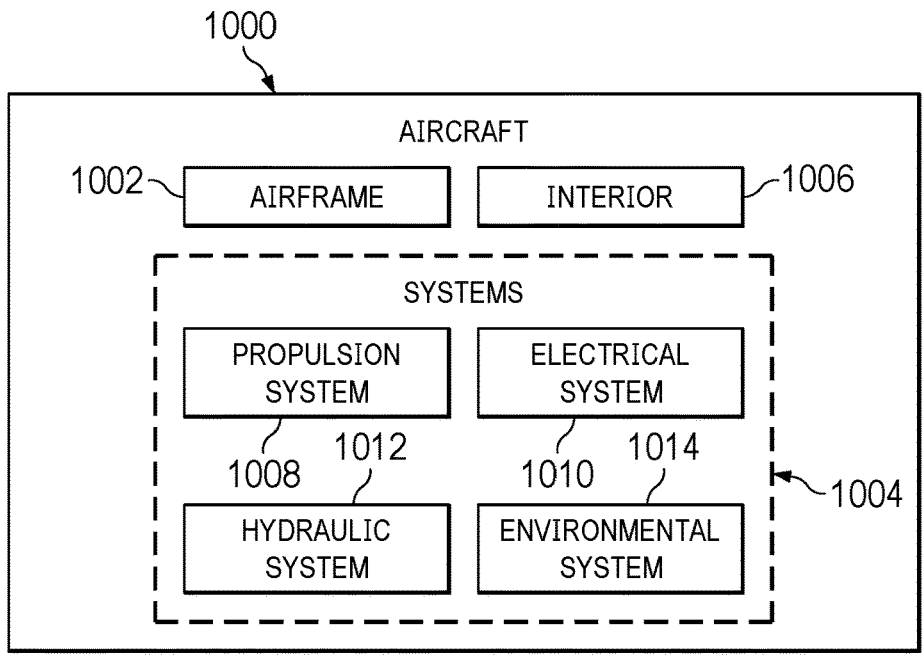
FIG. 10 is an illustration of an aircraft in a form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method in a form of a block diagram is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft in a form of a block diagram is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Apparatuses and methods embodied herein may be employed during at least one of the stages of aircraft manufacturing and service method 900. One or more illustrative embodiments may be manufactured or used during at least one of component and subassembly manufacturing 906, system integration 908, in service 912, or maintenance and service 914 of FIG. 9.

The illustrative examples provide an automated fiber placement (AFP) head composed of a plurality of lanes with different material widths. In some illustrative examples, the automated fiber placement (AFP) head is composed of ten lanes. The automated fiber placement (AFP) head is provided with any desirable quantity of material widths. In some illustrative examples, four different material widths are provided.

The illustrative examples allow for the automated fiber placement machine to accurately layup frame fillers within a range of widths in two or less passes per ply. In some illustrative examples, the widths vary from two to four inches wide. The automated fiber placement (AFP) machine can layup plies circumferentially (treating it likes multiple plies in the same sequence) and can layup all fillers directly onto the layup mandrel. This can lead to an overall time savings and reduce a significant amount of offline filler fabrication work and filler management. The illustrative examples can handle the ply ramps and different sized plies and composite fillers.

The illustrative examples provide a design of a new automated fiber placement (AFP) head with multiple materials to layup composite fillers. The automated fiber placement (AFP) head can layup the composite fillers directly on the layup mandrel.

Conventional manufacturing lays up small sheets and cut out filler patches. Conventional manufacturing of at least some composite fillers is performed using a hand layup. Conventional manufacturing of at least some composite fillers includes laying up the composite fillers offline one at a time. Afterwards, in conventional manufacturing, the shop has to store and manage hundreds or thousands of individual, unique fillers.

In one illustrative example, an automated fiber placement (AFP) head design is presented with 4 different material widths that can account for a 16-17 deg ply ramp. By generating a 0.025 inches spacing, the automated fiber placement (AFP) head generates chamfers within an acceptable range of a chamfer design.

In some illustrative examples, a nearby system can cut material widths to 1 inches, 1.05 inches and 1.10 inches and can be integrated into the manufacturing system. In some illustrative examples, the material widths can be provided by an external vendor.

The illustrative examples can rapidly improve productivity of frame filler fabrication. The illustrative examples reduce challenges of managing thousands of frame fillers. The automated fiber placement (AFP) head can be dockable. The automated fiber placement (AFP) head can attach to a typical automated fiber placement (AFP) machine.

Because each composite filler is an individual part and can be unique, utilizing the automated fiber placement (AFP) process of the illustrative examples can save significant time. The illustrative examples can apply the filler directly to the tool, which significantly reduces the part management of thousands of composite fillers.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An automated fiber placement system comprising:
a plurality of spools of composite material having a plurality of material widths, each spool of the plurality of spools having a respective material width of the plurality of material widths, wherein the plurality of spools comprises a first set of spools located along a first spool axis and a second set of spools located along a second spool axis, wherein the first spool axis and the second spool axis are spaced apart and parallel to each other; and
an automated fiber placement head configured to lay up composite tape from any desired spools of the plurality of spools simultaneously,
wherein the automated fiber placement head comprises:
a plurality of lanes for laying down the composite material, each lane of the plurality of lanes fed by a respective spool of the plurality of spools of composite material; and
a plurality of compression rollers, each compression roller of the plurality of compression rollers assigned to a respective lane of the plurality of lanes, each compression roller having a respective width based on a material width of a respective spool feeding the respective lane, wherein the plurality of compression rollers comprises a first set of compression rollers located along a first roller axis and a second set of compression rollers located along a second roller axis, wherein the first roller axis and the second roller axis are spaced apart and parallel to each other,
wherein the plurality of spools is ordered based on an angle of a chamfer in a design of a composite part, the chamfer having an angle created by differences in the respective widths, and
wherein each of the plurality of spools having the plurality of material widths is selected to layup a respective width of each ply of a composite filler in two passes or less.

2. The automated fiber placement system of claim 1, wherein the plurality of lanes is ordered to layup each ply of a composite filler in two passes or less.

3. The automated fiber placement system of claim 1, wherein the plurality of material widths is selected to provide ply widths every 0.05 inches within a range of ply widths in two passes or less.

4. The automated fiber placement system of claim 3, wherein the range is two inches to four inches.

5. The automated fiber placement system of claim 1, wherein the plurality of spools of composite material comprises three or more widths of composite material.

6. The automated fiber placement system of claim 1, wherein the plurality of spools of composite material comprises 0.25 inches, 1 inches, 1.05 inches, and 1.1 inches widths of composite material.

7. The automated fiber placement system of claim 1, wherein the plurality of lanes is ordered to place a plurality of material widths side-by-side to form a contiguous ply of a desired width and a desired length.

8. An automated fiber placement system comprising:
an automated fiber placement head configured to lay down a plurality of material widths of composite tape simultaneously to form a plurality of plies of a composite part, each of the plurality of plies having different widths; and
a plurality of spools of composite material mounted on the automated fiber placement head, the plurality of spools having the plurality of material widths of composite tape, wherein the plurality of spools comprises a first set of spools located along a first spool axis and a second set of spools located along a second spool axis, wherein the first spool axis and the second spool axis are spaced apart and parallel to each other,
wherein the plurality of spools of the automated fiber placement head is ordered based on an angle of a chamfer in a design of the composite part, the chamfer having an angle created by the different widths, and
wherein each of the plurality of spools having the plurality of material widths is selected to layup a respective width of each ply of a composite filler in two passes or less.

9. The automated fiber placement system of claim 8, wherein the plurality of spools of composite material comprises three or more widths of composite material.

10. The automated fiber placement system of claim 8 further comprising:

a plurality of compression rollers, each compression roller of the plurality of compression rollers assigned to a respective lane of the plurality of spools, each compression roller of the plurality of compression rollers having a width based on a respective width of the plurality of material widths of composite tape, wherein the plurality of compression rollers comprises a first set of compression rollers located along a first roller axis and a second set of compression rollers located along a second roller axis, wherein the first roller axis and the second roller axis are spaced apart and parallel to each other.

11. The automated fiber placement system of claim 8, wherein the plurality of spools is ordered to layup each ply of the composite part in two passes or less.

12. The automated fiber placement system of claim 8, wherein the plurality of spools is ordered to place a plurality of material widths side-by-side to form a contiguous ply of a desired width and a desired length.

13. A method of forming a composite filler having a chamfer, the method comprising:

laying down a first ply having a first width using an automated fiber placement head in two passes or less of the automated fiber placement head, wherein the automated fiber placement head comprises:

a plurality of spools of composite material having a plurality of material widths, each spool of the plurality of spools having a respective material width of the plurality of material widths, wherein the plurality of spools comprises a first set of spools located along a first spool axis and a second set of spools located along a second spool axis, wherein the first spool axis and the second spool axis are spaced apart and parallel to each other; and a plurality of compression rollers, each compression roller of the plurality of compression rollers, each compression roller having a respective width based on a material width of a respective spool, wherein the plurality of compression rollers comprises a first set of compression rollers located along a first roller axis and a second set of compression rollers located along a second roller axis, wherein the first roller axis and the second roller axis are spaced apart and parallel to each other; and laying down a second ply having a second width over the first ply using the automated fiber placement head in two passes or less of the automated fiber placement head, the second ply having a different sequence of composite tapes than the first ply, at least one of laying down the first ply or laying down the second ply comprises laying down more than one width of composite tape to generate the chamfer, the chamfer having an angle created by differences in widths of the first ply and the second ply.

14. The method of claim 13, wherein the laying down of more than one width of composite tape comprises laying down more than one width of composite tape simultaneously.

15. The method of claim 13, wherein a difference between the first width and the second width is in a range of 0.05 inches to 0.1 inches.

16. The method of claim 13 further comprising:

laying down a third ply having a third width, the third width different than the first width and the second width, and wherein a sequence of composite tapes in the third ply is different than a first sequence of composite tapes in the first ply and a second sequence of composite tapes in the second ply.

17. The method of claim 13, wherein laying down the second ply comprises positioning the second ply relative to the first ply to form the chamfer based on a difference in the first width and the second width.

18. A method of forming a composite filler having a chamfer, the method comprising:

laying down a plurality of composite tapes having a plurality of material widths using an automated fiber placement head to sequentially form a plurality of plies having a plurality of widths positioned to form the chamfer having an angle created by differences in the plurality of widths of the plurality of plies, wherein the automated fiber placement head comprises:

a plurality of spools of composite material having a plurality of material widths, each spool of the plurality of spools having a respective material width of the plurality of material widths, wherein the plurality of spools comprises a first set of spools located along a first spool axis and a second set of spools located along a second spool axis, wherein the first spool axis and the second spool axis are spaced apart and parallel to each other; and a plurality of compression rollers, each compression roller of the plurality of compression rollers, each compression roller having a respective width based on a material width of a respective spool, wherein the plurality of compression rollers comprises a first set of compression rollers located along a first roller axis and a second set of compression rollers located along a second roller axis, wherein the first roller axis and the second roller axis are spaced apart and parallel to each other, wherein each of the plurality of plies is formed using no more than two passes of the automated fiber placement head per ply.

19. The method of claim 18, wherein laying down the plurality of composite tapes having a plurality of material widths comprises:

laying down a first ply with a first width using a first sequence of composite tapes; and laying down a second ply with a second width using a second sequence of composite tapes, the first sequence of composite tapes and the second sequence of composite tapes having at least one composite tape not in common.

20. The method of claim 19, further comprising:

laying down a third ply having a third width, the third width different than the first width and the second width, and wherein a sequence of composite tapes in the third ply is different than a first sequence of composite tapes in the first ply and a second sequence of composite tapes in the second ply.

\* \* \* \* \*